United States Patent
Deshpande

(10) Patent No.: US 10,582,276 B2
(45) Date of Patent: Mar. 3, 2020

(54) SIGNALING RATINGS INFORMATION

(71) Applicant: SHARP KABUSHIKI KAISHA, Sakai, Osaka (JP)

(72) Inventor: Sachin G. Deshpande, Camas, WA (US)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/093,620

(22) PCT Filed: Apr. 10, 2017

(86) PCT No.: PCT/JP2017/014699
§ 371 (c)(1),
(2) Date: Oct. 13, 2018

(87) PCT Pub. No.: WO2017/179546
PCT Pub. Date: Oct. 19, 2017

(65) Prior Publication Data
US 2019/0124417 A1 Apr. 25, 2019

Related U.S. Application Data

(60) Provisional application No. 62/322,202, filed on Apr. 13, 2016.

(51) Int. Cl.
*H04N 7/16* (2011.01)
*H04N 21/84* (2011.01)
*H04N 21/262* (2011.01)
*H04N 21/45* (2011.01)
*H04N 21/454* (2011.01)
*H04N 21/845* (2011.01)

(52) U.S. Cl.
CPC ....... *H04N 21/84* (2013.01); *H04N 21/26258* (2013.01); *H04N 21/4532* (2013.01); *H04N 21/4542* (2013.01); *H04N 21/8456* (2013.01)

(58) Field of Classification Search
None
See application file for complete search history.

(56) References Cited

U.S. PATENT DOCUMENTS

| | | | |
|---|---|---|---|
| 2016/0226939 A1* | 8/2016 | Kwak | H04L 65/4076 |
| 2017/0034588 A1* | 2/2017 | Oh | H04N 21/26258 |
| 2017/0134824 A1* | 5/2017 | Kitazato | H04H 20/93 |
| 2017/0201775 A1* | 7/2017 | Oh | H04N 21/234 |
| 2018/0109743 A1* | 4/2018 | Oh | H04N 5/355 |
| 2018/0124439 A1* | 5/2018 | Hwang | H04N 13/128 |
| 2018/0131971 A1* | 5/2018 | Hwang | H04N 21/235 |
| 2018/0175955 A1* | 6/2018 | Kitazato | H04L 65/607 |
| 2018/0205975 A1* | 7/2018 | Oh | H04N 21/2362 |

OTHER PUBLICATIONS

"Location Enabler Release Requirements", Candidate Version 1.0—Nov. 18, 2004, Open Mobile Alliance OMA-RD-LER-V1_0-20041118-C.

(Continued)

*Primary Examiner* — William J Kim
(74) *Attorney, Agent, or Firm* — ScienBiziP, P.C.

(57) ABSTRACT

A system for content advisory rating information.

1 Claim, 12 Drawing Sheets

(56) References Cited

OTHER PUBLICATIONS

"Service Guide for Mobile Broadcast Services", Approved Version 1.0.1—Jan. 9, 2013, Open Mobile Alliance OMA-TS-BCAST_Service_Guide-V1_0_1-20130109-A.
"Service Guide for Mobile Broadcast Services", Approved Version 1.1—Oct. 29, 2013, Open Mobile Alliance OMA-TS-BCAST_Service_Guide-V1_1-20131029-A.
"ATSC Standard: Program and System Information Protocol for Terrestrial Broadcast and Cable", Doc. A65/2013 Aug. 7, 2013.
"XML Path Language (XPath) 2.0 (Second Edition)", W3C Recommendation Dec. 14, 2010 (Link errors corrected Jan. 3, 2011; Status updated Oct. 2016), http://www.w3.org/TR/xpath20/.
"XSL Transformations (XSLT) Version 3.0", W3C Recommendation Jun. 8, 2017, https://www.w3.org/TR/2017/REC-xslt-30-20170608/.
"Information technology—Dynamic adaptive streaming over HTTP (DASH)—Part 1: Media presentation description and segment formats", International Standard, ISO/IEC, 23009-1, Second edition, May 15, 2014.
MPEG•H Systems, "Text of ISO/IEC 2nd CD 23008-1 MPEG Media Transport", ISO/IEC JTC1/SC29/WG11, MPEG/N 13293, Geneva, Switzerland, Jan. 2013.
"Universal Mobile Telecommunications System (UMTS); LTE; Multimedia Broadcast/Multicast Service (MBMS); Protocols and codecs", 3GPP TS 26.346 version 12.4.0 Release 12, Jan. 2015.
"Uniform Resource Identifier (URI): Generic Syntax", https://www.ietf.org/rfc/rfc3986.txt.
"ATSC Candidate Standard: Signaling, Delivery, Synchronization, and Error Protection", (A/331), Doc.S33-174r2, Jun. 21, 2016,pp. 58-61, [retrieved on Jun. 28, 2017].

\* cited by examiner

| Name | Type | Category | Cardinality | Description | Data Type |
|---|---|---|---|---|---|
| | | | | | |

| Name | Type | Category | Cardinality | Description | Data Type |
|---|---|---|---|---|---|
| ContentAdvisoryRatings | E1 | NM/TM | 0..N | Content advisory rating - one for each rating region.<br><br>Contains the following elements:<br><br>RegionIdentifier<br><br>RatingDescription<br><br>RatedDimensions<br><br>RatingDimVal | |
| RegionIdentifier | E2 | NM/TM | 0..1 | Specifies the rating region for which the following rating description, rated dimensions, rating dimension, and rating value data is specified. If not present the value of RegionIdentifier is inferred to be 1. | unsignedByte |
| RatingDescription | E2 | NM/TM | 1 | Rating description text which represents the rating suitable for on-screen display. Contains the following attribute:<br><br>xml:lang | string |
| xml:lang | A | NM/TM | 0..1 | The language of the RatingDescription expressed with XML attribute 'xml:lang' | string |
| RatedDimensions | E2 | NM/TM | 0..1 | The number of region specific rating dimensions for which content advisory rating is specified. | unsignedByte |
| RatingDimVal | E2 | NM/TM | 1..N | Content advisory rating dimension and rating value for each rated dimension. Contains the following elements:<br><br>RatingDimension<br><br>RatingValueString | |
| RatingDimension | E3 | NM/TM | 0..1 | Rating dimension index for which the rating value is specified. | unsignedByte |
| RatingValueString | E3 | NM/TM | 1 | Rating value text string for the rating dimension specified in the associated RatingDimension element. | String |
| RatingValue | E3 | NM/TM | 1 | Rating value for the rating dimension specified in the associated RatingDimension element.<br>Contains the following attribute:<br>xml:lang | unsignedByte |

FIG. 5

```
<?xml version="1.0" encoding="UTF-8"?>
<xs:schema xmlns:xs="http://www.w3.org/2001/XMLSchema">
    <xs:import namespace="http://www.w3.org/XML/1998/namespace"
        schemaLocation="http://www.w3.org/2001/xml.xsd"/>
    <xs:element name="ContentAdvisoryRatings" type="CARatingType"/>
    <xs:complexType name="CARatingType">
        <xs:sequence>
            <xs:element name="RegionIdentifier" type="xs:unsignedByte"
            minOccurs="0" maxOccurs="1"/>
            <xs:element name="RatingDescription" maxOccurs="1">
                <xs:complexType>
                    <xs:simpleContent>
                        <xs:extension base="xs:string">
                            <xs:attribute ref="xml:lang" use="optional"
                            default="en"/>
                        </xs:extension>
                    </xs:simpleContent>
                </xs:complexType>
            </xs:element>
            <xs:element name="RatedDimensions" type="xs:unsignedByte"
            minOccurs="0" maxOccurs="1"/>
            <xs:element name="RatingDimVal" type="RatingDimValType"
            minOccurs="1" maxOccurs="unbounded"/>
        </xs:sequence>
    </xs:complexType>

<xs:complexType name="RatingDimValType">
        <xs:sequence>
            <xs:element name="RatingDimension" type="xs:unsignedByte"
            minOccurs="0" maxOccurs="1"/>
            <xs:choice>
                <xs:element name="RatingValue" type="xs:unsignedByte"
                minOccurs="1"/>
                <xs:element name="RatingValueString" type="xs:string"
                minOccurs="1"/>
            </xs:choice>
        </xs:sequence>
    </xs:complexType>
</xs:schema>
```

FIG. 6

| Name | Type | Category | Cardinality | Description | Data Type |
|---|---|---|---|---|---|
| ContentAdvisoryRatings | E1 | NM/TM | 0..N | Content advisory rating - one for each rating region.<br><br>Contains the following elements:<br><br>RegionIdentifier<br><br>RatingDescription<br><br>RatedDimensions<br><br>RatingDimVal | |
| RegionIdentifier | E2 | NM/TM | 0..1 | Specifies the rating region for which the following rating description, rated dimensions, rating dimension, and rating value data is specified. If not present the value of RegionIdentifier is inferred to be 0. | unsignedByte |
| RatingDescription | E2 | NM/TM | 1 | Rating description text which represents the rating suitable for on-screen display. Contains the following attribute:<br><br>xml:lang | string |
| xml:lang | A | NM/TM | 0..1 | The language of the RatingDescription expressed with XML attribute 'xml:lang' | string |
| RatedDimensions | E2 | NM/TM | 0..1 | The number of region specific rating dimensions for which content advisory rating is specified. | unsignedByte |
| RatingDimVal | E2 | NM/TM | 1..N | Content advisory rating dimension and rating value for each rated dimension. Contains the following elements:<br><br>RatingDimension<br><br>RatingValueString | |
| RatingDimension | E3 | NM/TM | 0..1 | Rating dimension index for which the rating value is specified. | unsignedByte |
| RatingValueString | E3 | NM/TM | 1 | Rating value text string for the rating dimension specified in the associated RatingDimension element. | String |

FIG. 7

```
<xs:element name="ContentAdvisoryRatings" type="CARatingType"/>
    <xs:complexType name="CARatingType">
        <xs:sequence>
            <xs:element name="RegionIdentifier" type="xs:unsignedByte"
            minOccurs="0" maxOccurs="1"/>
            <xs:element name="RatingDescription" maxOccurs="1">
                <xs:complexType>
                    <xs:simpleContent>
                        <xs:extension base="xs:string">
                            <xs:attribute ref="xml:lang" use="optional"
                            default="en"/>
                        </xs:extension>
                    </xs:simpleContent>
                </xs:complexType>
            </xs:element>
            <xs:element name="RatedDimensions" type="xs:unsignedByte"
            minOccurs="0" maxOccurs="1"/>
            <xs:element name="RatingDimVal" type="RatingDimValType"
            minOccurs="1" maxOccurs="unbounded"/>
        </xs:sequence>
    </xs:complexType>
    <xs:complexType name="RatingDimValType">
        <xs:sequence>
            <xs:element name="RatingDimension" type="xs:unsignedByte"
            minOccurs="0" maxOccurs="1"/>
            <xs:element name="RatingValueString" type="xs:string"
                minOccurs="1"/>
</xs:sequence>
    </xs:complexType>
```

FIG. 8

```
concat(concat(//RegionIdentifier,',',concat(concat
('''',//RatingDescription),'''')),',',normalize-
space(string-join(//RatingDimVal /
concat("{",normalize-space(.), "}"), "")))
```

FIG. 11

```
<?xml version="1.0" encoding="UTF-8"?>
<xsl:stylesheet version="1.0" xmlns:xsl="http://www.w3.org/1999/XSL/Transform">
<xsl:output method="text"/>
   <xsl:variable name="squote">'</xsl:variable>
   <xsl:template match="/">
      <xsl:value-of select="concat(//RegionIdentifier,',')" />
      <xsl:value-of
select="concat(concat(concat($squote,//RatingDescription),$squote),',')" />
      <xsl:for-each select="//RatingDimVal">
         <xsl:value-of select="concat(concat('{',normalize-space(concat(., ))),'}')" />
      </xsl:for-each>
   </xsl:template>
</xsl:stylesheet>
```

FIG. 12

```
<?xml version="1.0" encoding="UTF-8"?>
<xsl:stylesheet version="1.0"
xmlns:xsl="http://www.w3.org/1999/XSL/Transform">

<xsl:output method="text"/>

<xsl:variable name="squote">'</xsl:variable>

<xsl:template match="/">
       <xsl:value-of select="concat(//RegionIdentifier,',')" />
       <xsl:value-of
select="concat(concat(concat($squote,//RatingDescription),$squote),',')" />
       <xsl:for-each select="//RatingDimVal">
          <xsl:value-of select="concat(concat('{',RatingDimension),' ')" />
          <xsl:value-of
select="concat(concat(concat($squote,RatingValueString),$squote),'}')" />
       </xsl:for-each>
    </xsl:template>
</xsl:stylesheet>
```

FIG. 13

```
<?xml version="1.0" encoding="UTF-8"?>
<xsl:stylesheet version="1.0"
xmlns:xsl="http://www.w3.org/1999/XSL/Transform">

<xsl:output method="text"/>

<xsl:variable name="squote">'</xsl:variable>

<xsl:template match="/">
       <xsl:value-of select="concat(//RegionIdentifier,',')" />
       <xsl:value-of
select="concat(concat(concat($squote,//RatingDescription),$squote),',')" />
       <xsl:for-each select="//RatingDimVal">
          <xsl:value-of select="concat(concat('{',RatingDimension),' ')" />
          <xsl:value-of
select="concat(concat(concat($squote,RatingValue),$squote),'}')" />
       </xsl:for-each>
    </xsl:template>
</xsl:stylesheet>
```

FIG. 14

SIGNALING RATINGS INFORMATION

TECHNICAL FIELD

The present disclosure relates generally to a service signaling and content advisory rating.

BACKGROUND ART

A broadcast service is capable of being received by users having broadcast receivers. Broadcast services can be roughly divided into two categories, namely, a radio broadcast service carrying audio and a multimedia broadcast service carrying audio, video and data. Such broadcast services have developed from analog services to digital services. More recently, various types of broadcasting systems (such as a cable broadcasting system, a satellite broadcasting system, an Internet based broadcasting system, and a hybrid broadcasting system using a cable network, Internet, and/or a satellite) provide high quality audio and video broadcast services along with a high-speed data service. Also, broadcast services include sending and/or receiving audio, video, and/or data directed to an individual computer and/or group of computers and/or one or more mobile communication devices.

In addition to more traditional stationary receiving devices, mobile communication devices are likewise configured to support such services. Such configured mobile devices have facilitated users to use such services while on the move, such as mobile phones. An increasing need for multimedia services has resulted in various wireless/broadcast services for mobile communications and general wire communications. Further, this convergence has merged the environment for different wire and wireless broadcast services.

Open Mobile Alliance (OMA), is a standard for interworking between individual mobile solutions, serves to define various application standards for mobile software and Internet services. OMA Mobile Broadcast Services Enabler Suite (OMA BCAST) is a specification designed to support mobile broadcast technologies. The OMA BCAST defines technologies that provide IP-based mobile content delivery, which includes a variety of functions such as a service guide, downloading and streaming, service and content protection, service subscription, and roaming.

The foregoing and other objectives, features, and advantages of the invention will be more readily understood upon consideration of the following detailed description of the invention, taken in conjunction with the accompanying drawings.

SUMMARY OF INVENTION

One embodiment of the present invention discloses a method for decoding a media presentation description associated with a program included within a video bitstream comprising: (a) receiving a period within said media presentation description; (b) receiving at least one adaptation set, within said period, alternatively describing at least one video component or describing no video component; (c) receiving at least one rating element, where each of said at least one rating element indicates each of at least one advisory rating; and (d) decoding said media presentation description, (e) wherein only one rating element is an element of said at least one adaptation set received for said period when said program is associated with only one advisory rating, where said only one advisory rating includes a uniform resource identifier for a scheme describing said only one advisory rating for said program, (f) wherein at least two rating elements are elements of at least two adaptation sets received for said period when said program is associated with at least two advisory ratings, where each of said at least two advisory ratings includes a different uniform resource identifier from each other describing each of said at least two advisory ratings for said program, (g) wherein a respective said at least two rating elements is an element of a respective said at least two adaptation sets received for said period, where said respective said at least two adaptation sets includes a respective role elements that includes a uniform resource identifier for a scheme, (h) wherein said at least one video component does not include a corresponding said at least one advisory rating, (i) wherein when said period includes no adaptation set describing said no video component, said at least one rating element only appears in a first one of said at least one adaptation set for said period.

BRIEF DESCRIPTION OF DRAWINGS

FIG. 5 illustrates content advisory rating in a service announcement.

FIG. 6 illustrates an Extensible Markup Language (XML) schema for content advisory rating information.

FIG. 7 illustrates content advisory rating in a service announcement.

FIG. 8 illustrates an XML schema for content advisory rating information.

FIG. 11 illustrates an XML Path Language (XPath) transformation.

FIG. 12 illustrates an eXtensible Stylesheet Language (XSL) Transformation (XSLT).

FIG. 13 illustrates a XSL Transformation (XSLT)

FIG. 14 illustrates a XSL Transformation (XSLT)

DESCRIPTION OF EMBODIMENTS

Figure 1:
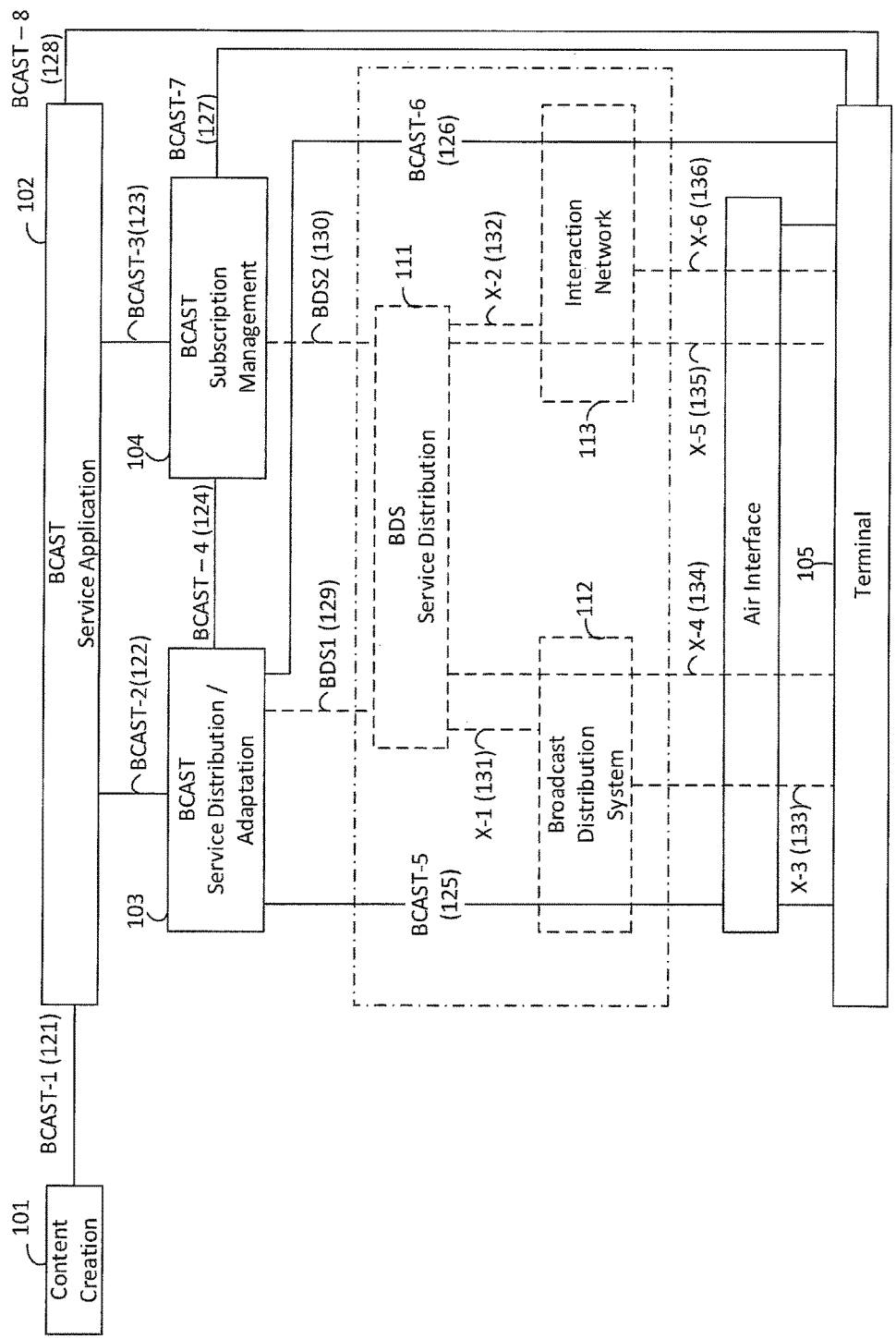
FIG. 1 is a block diagram illustrating logical architecture of a BCAST system specified by OMA BCAST working group in an application layer and a transport layer.

Referring to FIG. 1, a logical architecture of a broadcast system specified by OMA (Open Mobile Alliance) BCAST may include an application layer and a transport layer. The logical architecture of the BCAST system may include a Content Creation 101, a BCAST Service Application 102, a BCAST Service Distribution/Adaptation (BSDA) 103, a BCAST Subscription Management (BSM) 104, a Terminal 105, a Broadcast Distribution System (BDS) Service Distribution 111, a BDS 112, and an Interaction Network 113. It is to be understood that the broadcast system and/or receiver system may be reconfigured. It is to be understood that the broadcast system and/or receiver system may include additional elements and/or fewer elements.

In general, the Content Creation 101 may provide content that is the basis of BCAST services. The content may include files for common broadcast services, e.g., data for a movie including audio and video. The Content Creation 101 provides a BCAST Service Application 102 with attributes for the content, which are used to create a service guide and to determine a transmission bearer over which the services will be delivered.

In general, the BCAST Service Application 102 may receive data for BCAST services provided from the Content Creation 101, and converts the received data into a form suitable for providing media encoding, content protection, interactive services, etc. The BCAST Service Application 102 provides the attributes for the content, which is received from the Content Creation 101, to the BSDA 103 and the BSM 104.

In general, the BSDA 103 may perform operations, such as file/streaming delivery, service gathering, service protection, service guide creation/delivery and service notification, using the BCAST service data provided from the BCAST Service Application 102. The BSDA 103 adapts the services to the BDS 112.

In general, the BSM 104 may manage, via hardware or software, service provisioning, such as subscription and charging-related functions for BCAST service users, information provisioning used for BCAST services, and mobile terminals that receive the BCAST services.

In general, the Terminal 105 may receive content/service guide and program support information, such as content protection, and provides a broadcast service to a user. The BDS Service Distribution 111 delivers mobile broadcast services to a plurality of terminals through mutual communication with the BDS 112 and the Interaction Network 113.

In general, the BDS 112 may deliver mobile broadcast services over a broadcast channel, and may include, for example, a Multimedia Broadcast Multicast Service (MBMS) by 3rd Generation Project Partnership (3GPP), a Broadcast Multicast Service (BCMCS) by 3rd Generation Project Partnership 2 (3GPP2), a DVB-Handheld (DVB-H) by Digital Video Broadcasting (DVB), or an Internet Protocol (IP) based broadcasting communication network. The Interaction Network 113 provides an interaction channel, and may include, for example, a cellular network.

The reference points, or connection paths between the logical entities of FIG. 1, may have a plurality of interfaces. The interfaces are used for communication between two or more logical entities for their specific purposes. A message format, a protocol and the like are applied for the interfaces. In some examples, there are no logical interfaces between one or more different functions.

BCAST-1 121 is a transmission path for content and content attributes, and BCAST-2 122 is a transmission path for a content-protected or content-unprotected BCAST service, attributes of the BCAST service, and content attributes. BCAST-3 123 is a transmission path for attributes of a BCAST service, attributes of content, user preference/subscription information, a user request, and a response to the request. BCAST-4 124 is a transmission path for a notification message, attributes used for a service guide, and a key used for content protection and service protection.

BCAST-5 125 is a transmission path for a protected BCAST service, an unprotected BCAST service, a content-protected BCAST service, a content-unprotected BCAST service, BCAST service attributes, content attributes, a notification, a service guide, security materials such as a Digital Right Management (DRM) Right Object (RO) and key values used for BCAST service protection, and other data and signaling transmitted through a broadcast channel.

BCAST-6 126 is a transmission path for a protected BCAST service, an unprotected BCAST service, a content-protected BCAST service, a content-unprotected BCAST service, BCAST service attributes, content attributes, a notification, a service guide, security materials such as a DRM RO and key values used for BCAST service protection, and other data and signaling transmitted through an interaction channel.

BCAST-7 127 is a transmission path for service provisioning, subscription information, device management, and user preference information transmitted through an interaction channel for control information related to receipt of security materials, such as a DRM RO and key values used for BCAST service protection.

BCAST-8 128 is a transmission path through which user data for a BCAST service is provided. BDS-1 129 is a transmission path for a protected BCAST service, an unprotected BCAST service, BCAST service attributes, content attributes, a notification, a service guide, and security materials, such as a DRM RO and key values used for BCAST service protection.

BDS-2 130 is a transmission path for service provisioning, subscription information, device management, and security materials, such as a DRM RO and key values used for BCAST service protection.

X-1 131 is a reference point between the BDS Service Distribution 111 and the BDS 112. X-2 132 is a reference point between the BDS Service Distribution 111 and the Interaction Network 113. X-3 133 is a reference point between the BDS 112 and the Terminal 105. X-4 134 is a reference point between the BDS Service Distribution 111 and the Terminal 105 over a broadcast channel. X-5 135 is a reference point between the BDS Service Distribution 111 and the Terminal 105 over an interaction channel. X-6 136 is a reference point between the Interaction Network 113 and the Terminal 105.

Figure 2:
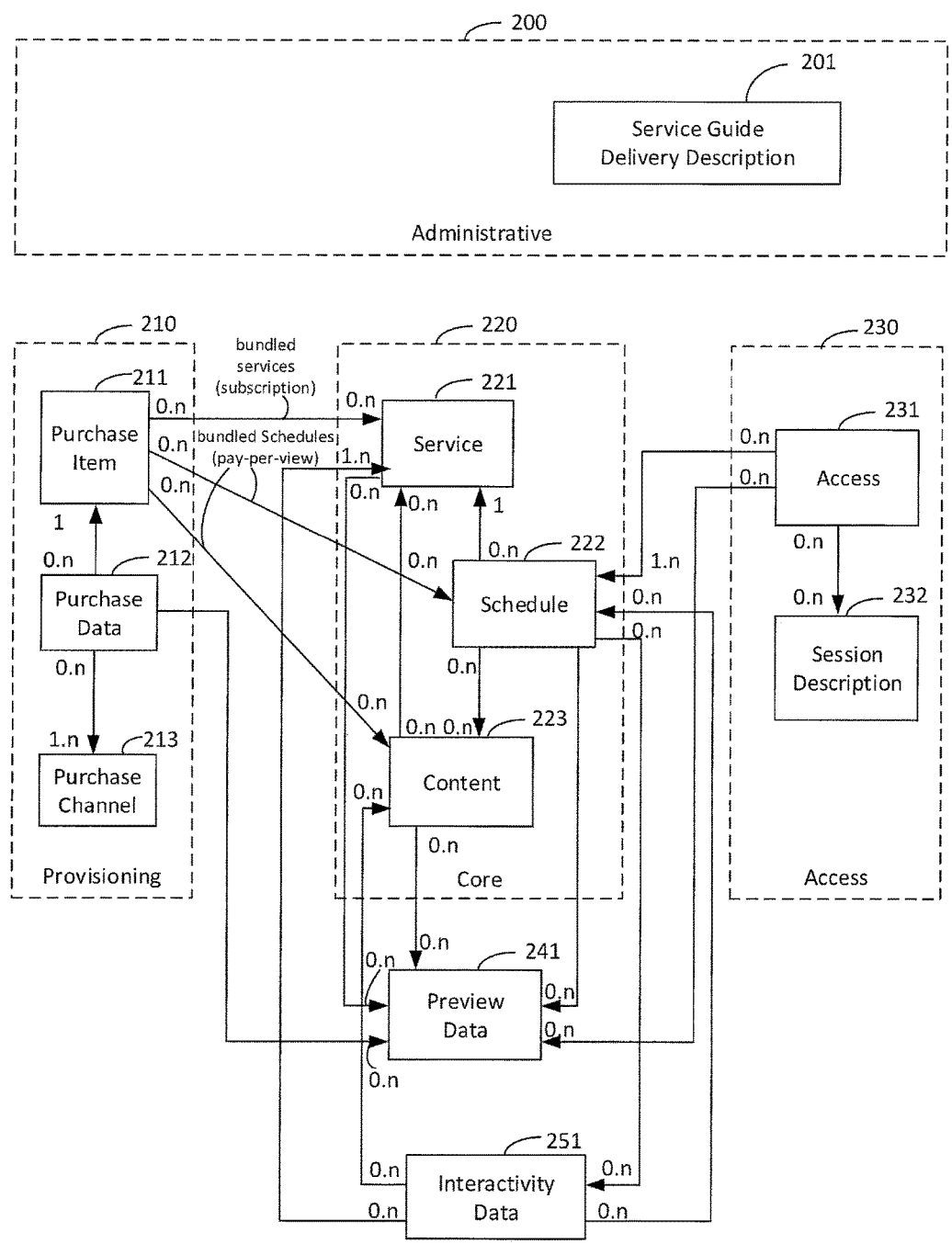
FIG. 2 is a diagram illustrating a structure of a service guide for use in the OMA BCAST system.

Referring to FIG. 2, an exemplary service guide for the OMA BCAST system is illustrated. For purposes of illustration, the solid arrows between fragments indicate the reference directions between the fragments. It is to be understood that the service guide system may be reconfigured. It is to be understood that the service guide system may include additional elements and/or fewer elements. It is to be understood that functionality of the elements may be modified and/or combined.

Figure 2A:
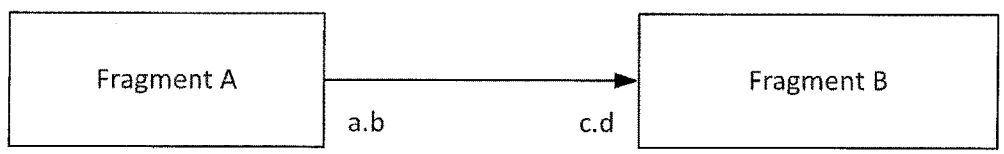
FIG. 2A is a diagram showing cardinalities and reference direction between service guide fragments.

FIG. 2A is a diagram showing cardinalities and reference direction between service guide fragments. The meaning of the cardinalities shown in FIG. 2 is the following: One instantiation of Fragment A as in FIG. 2A references c to d instantiations of Fragment B. If c=d, d is omitted. Thus, if c>0 and Fragment A exists, at least c instantiation of Fragment B may also exist, but at most d instantiations of Fragment B may exist. Vice versa, one instantiation of Fragment B is referenced by a to b instantiations of Fragment A. If a=b, b is omitted. The arrow connection from Fragment A pointing to Fragment B indicates that Fragment A contains the reference to Fragment B.

With respect to FIG. 2, in general, the service guide may include an Administrative Group 200 for providing basic information about the service guide, a Provisioning Group 210 for providing subscription and purchase information, a Core Group 220 that acts as a core part of the service guide, and an Access Group 230 for providing access information that control access to services and content.

The Administrative Group 200 may include a Service Guide Delivery Descriptor (SGDD) 201. The Provision Group 210 may include a Purchase Item 211, a Purchase Data 212, and a Purchase Channel 213. The Core Group 220 may include a Service 221, a Schedule 222, and a Content 223. The Access Group 230 may include an Access 231 and a Session Description 232.

The service guide may further include Preview Data 241 and Interactivity Data 251 in addition to the Administrative Group 200, Provision Group 210, Core Group 220, and Access Group 230.

The aforementioned components may be referred to as basic units or fragments constituting aspects of the service guide, for purposes of identification.

The SGDD 201 may provide information about a delivery session where a Service Guide Delivery Unit (SGDU) is located. The SGDU is a container that contains Purchase Item 211, Purchase Data 212, Purchase Channel 213, Service 221, Schedule 222, Content 223, Access 231, Session Description 232, Preview Data 241, and Interactivity Data 251, which constitute the service guide. The SGDD may also provide the information on the entry points for receiving the grouping information and notification messages.

The Service 221, which is an upper aggregate of the content included in the broadcast service, may include information on service content, genre, service location, etc. In general, the 'Service' fragment describes at an aggregate level the content items which comprise a broadcast service. The service may be delivered to the user using multiple means of access, for example, the broadcast channel and the interactive channel. The service may be targeted at a certain user group or geographical area. Depending on the type of the service it may have interactive part(s) and/or broadcast part(s). Further, the service may include components not directly related to the content but to the functionality of the service such as purchasing or subscription information. As the part of the Service Guide, the 'Service' fragment forms a central hub referenced by the other fragments including 'Access', 'Schedule', 'Content' and 'PurchaseItem' fragments. In addition to that, the 'Service' fragment may reference 'PreviewData' fragment. It may be referenced by none or several of these fragments. Together with the associated fragments the terminal may determine the details associated with the service at any point of time. These details may be summarized into a user-friendly display, for example, of what, how and when the associated content may be consumed and at what cost.

The Access 231 may provide access-related information for allowing the user to view the service and delivery method, and session information associated with the corresponding access session. As such, the 'Access' fragment describes how the service may be accessed during the lifespan of the service. This fragment contains or references Session Description information and indicates the delivery method. One or more 'Access' fragments may reference a 'Service' fragment, offering alternative ways for accessing or interacting with the associated service. For the Terminal, the 'Access' fragment provides information on what capabilities are needed for the terminal to receive and render the service. The 'Access' fragment provides Session Description parameters either in the form of inline text, or through a pointer in the form of a URI to a separate Session Description. Session Description information may be delivered over either the broadcast channel or the interaction channel.

The Session Description 232 may be included in the Access 231, and may provide location information in a Uniform Resource Identifier (URI) form so that the terminal may detect information on the Session Description 232. The Session Description 232 may provide address information, codec information, etc., about multimedia content existing in the session. As such, the 'SessionDescription' is a Service Guide fragment which provides the session information for access to a service or content item. Further, the Session Description may provide auxiliary description information, used for associated delivery procedures. The Session Description information is provided using either syntax of SDP in text format, or through a 3GPP MBMS User Service Bundle Description (USBD) [3GPP TS 26.346]. Auxiliary description information is provided in XML format and contains an Associated Delivery Description as specified in [BCAST10-Distribution]. Note that in case SDP syntax is used, an alternative way to deliver the Session Description is by encapsulating the SDP in text format in 'Access' fragment. Note that Session Description may be used for Service Guide delivery itself as well as for the content sessions.

The Purchase Item 211 may provide a bundle of service, content, time, etc., to help the user subscribe to or purchase the Purchase Item 211. As such, the 'PurchaseItem' fragment represents a group of one or more services (i.e. a service bundle) or one or more content items, offered to the end user for free, for subscription and/or purchase. This fragment can be referenced by 'PurchaseData' fragment(s) offering more information on different service bundles. The 'PurchaseItem' fragment may be also associated with: (1) a 'Service' fragment to enable bundled services subscription and/or, (2) a 'Schedule' fragment to enable consuming a certain service or content in a certain timeframe (pay-per-view functionality) and/or, (3) a 'Content' fragment to enable purchasing a content file related to a service and/or, (4) other 'PurchaseItem' fragments to enable bundling of purchase items.

The Purchase Data 212 may include detailed purchase and subscription information, such as price information and promotion information, for the service or content bundle. The Purchase Channel 213 may provide access information for subscription or purchase. As such, the main function of the 'PurchaseData' fragment is to express the available pricing information about the associated purchase item. The 'PurchaseData' fragment collects the information about one or several purchase channels and may be associated with PreviewData specific to a certain service or service bundle. It carries information about pricing of a service, a service bundle, or a content item. Also, information about promotional activities may be included in this fragment. The SGDD may also provide information regarding entry points for receiving the service guide and grouping information about the SGDU as the container.

The Preview Data 241 may be used to provide preview information for a service, schedule, and content. As such, 'PreviewData' fragment contains information that is used by the terminal to present the service or content outline to users, so that the users can have a general idea of what the service or content is about. 'PreviewData' fragment can include simple texts, static images (for example, logo), short video clips, or even reference to another service which could be a low bit rate version for the main service. 'Service', 'Content', 'PurchaseData', 'Access' and 'Schedule' fragments may reference 'PreviewData' fragment.

The Interactivity Data 251 may be used to provide an interactive service according to the service, schedule, and content during broadcasting. More detailed information about the service guide can be defined by one or more elements and attributes of the system. As such, the InteractivityData contains information that is used by the terminal to offer interactive services to the user, which is associated with the broadcast content. These interactive services enable users to e.g. vote during shows or to obtain content related to the broadcast content. 'InteractivityData' fragment points to one or many 'InteractivityMedia' documents that include xhtml files, static images, email template, SMS template, MMS template documents, etc. The 'InteractivityData' fragment may reference the 'Service', 'Content' and 'Schedule' fragments, and may be referenced by the 'Schedule' fragment.

The 'Schedule' fragment defines the timeframes in which associated content items are available for streaming, downloading and/or rendering. This fragment references the 'Service' fragment. If it also references one or more 'Content' fragments or 'InterativityData' fragments, then it defines the valid distribution and/or presentation timeframe of those content items belonging to the service, or the valid distribution timeframe and the automatic activation time of the InteractivityMediaDocuments associated with the service. On the other hand, if the 'Schedule' fragment does not reference any 'Content' fragment(s) or 'InteractivityDat'a fragment(s), then it defines the timeframe of the service availability which is unbounded.

The 'Content' fragment gives a detailed description of a specific content item. In addition to defining a type, description and language of the content, it may provide information about the targeted user group or geographical area, as well as genre and parental rating. The 'Content' fragment may be referenced by Schedule, PurchaseItem or 'InteractivityData' fragment. It may reference 'PreviewData' fragment or 'Service' fragment.

The 'PurchaseChannel' fragment carries the information about the entity from which purchase of access and/or content rights for a certain service, service bundle or content item may be obtained, as defined in the 'PurchaseData' fragment. The purchase channel is associated with one or more Broadcast Subscription Managements (BSMs). The terminal is permitted to access a particular purchase channel if it is affiliated with a BSM that is also associated with that purchase channel. Multiple purchase channels may be associated to one 'PurchaseData' fragment. A certain end-user can have a "preferred" purchase channel (e.g. his/her mobile operator) to which purchase requests may be directed. The preferred purchase channel may even be the only channel that an end-user is allowed to use.

The ServiceGuideDeliveryDescriptor is transported on the Service Guide Announcement Channel, and informs the terminal the availability, metadata and grouping of the fragments of the Service Guide in the Service Guide discovery process. A SGDD allows quick identification of the Service Guide fragments that are either cached in the terminal or being transmitted. For that reason, the SGDD is preferably repeated if distributed over broadcast channel. The SGDD also provides the grouping of related Service Guide fragments and thus a means to determine completeness of such group. The ServiceGuideDeliveryDescriptor is especially useful if the terminal moves from one service coverage area to another. In this case, the ServiceGuideDeliveryDescriptor can be used to quickly check which of the Service Guide fragments that have been received in the previous service coverage area are still valid in the current service coverage area, and therefore don't have to be re-parsed and re-processed.

Although not expressly depicted, the fragments that constitute the service guide may include element and attribute values for fulfilling their purposes. In addition, one or more of the fragments of the service guide may be omitted. Also, one or more fragments of the service guide may be combined. Also, different aspects of one or more fragments of the service guide may be combined together, reorganized, and otherwise modified, or constrained.

Figures 3, 4:
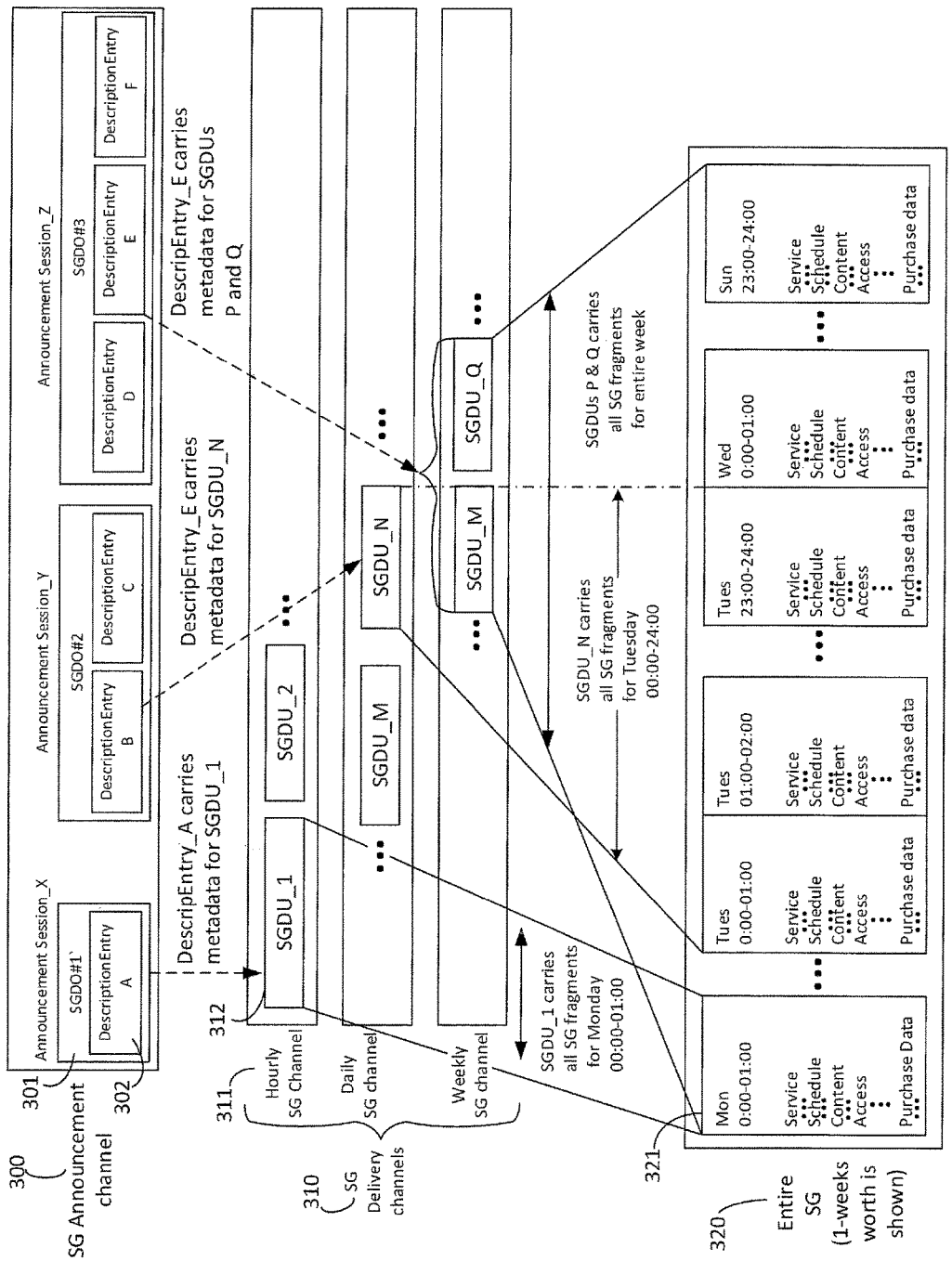
FIG. 3 is a block diagram illustrating a principle of the service guide delivery method.
FIG. 4 illustrates a description scheme.

Referring to FIG. 3, an exemplary block diagram illustrates aspects of a service guide delivery technique. The SGDD 201 may include the session information, grouping information, and notification message access information related to fragments containing service information. When the terminal 105 turns on or begins to receive the service guide, it may access a Service Guide Announcement Channel (SG Announcement Channel) 300.

The SG Announcement Channel 300 may include at least one of SGDD 201 (e.g., SGDD #1, . . . , SGDD #2, SGDD #3), which may be formatted in any suitable format, such as that illustrated in Service Guide for Mobile Broadcast Services, Open Mobile Alliance, Version 1.0.1, Jan. 9, 2013 and/or Service Guide for Mobile Broadcast Services, open Mobile Alliance, Version 1.1, Oct. 29, 3013; both of which are incorporated by reference in their entirety. The descriptions of elements and attributes constituting the SGDD 201 may be reflected in any suitable format, such as for example, a table format and/or in an eXtensible Markup Language (XML) schema.

The actual data is preferably provided in XML format according to the SGDD 201. The information related to the service guide may be provided in various data formats, such as binary, where the elements and attributes are set to corresponding values, depending on the broadcast system.

The terminal 105 may acquire transport information about a Service Guide Delivery Unit (SGDU) 312 containing fragment information from a DescriptorEntry of the SGDD fragment received on the SG Announcement Channel 300.

The DescriptorEntry 302, which may provide the grouping information of a Service Guide includes the "GroupingCriteria", "ServiceGuideDeliveryUnit", "Transport", and "AlternativeAccessURI". The transport-related channel information may be provided by the "Transport" or "AlternativeAccessURI", and the actual value of the corresponding channel is provided by "ServiceGuideDeliveryUnit". Also, upper layer group information about the SGDU 312, such as "Service" and "Genre", may be provided by "GroupingCriteria". The terminal 105 may receive and present the SGDU 312 information to the user according to the corresponding group information.

Once the transport information is acquired, the terminal 105 may access the Delivery Channels acquired from a DescriptorEntry 302 in an SGDD 301 on an SG Delivery Channel 310 to receive the SGDU 312. The SG Delivery Channels can be identified using the "GroupingCriteria". In the case of time grouping, the SGDU can be transported with a time-based transport channel such as an Hourly SG Channel 311 and a Daily SG Channel. Accordingly, the terminal 105 can selectively access the channels and receive the SGDUs existing on the corresponding channels. Once the SGDU is received on the SG Delivery Channels 310, the terminal 105 checks the fragments contained in the SGDUs received on the SG Delivery Channels 310 and assembles the fragments to display an actual full service guide 320 on the screen which can be subdivided on an hourly basis 321.

In the mobile broadcast system, the service guide is formatted and transmitted such that configured terminals receive the broadcast signals of the corresponding broadcast system. For example, the service guide information transmitted by a DVB-H system can only be received by terminals configured to receive the DVB-H broadcast.

The service providers provide bundled and integrated services using various transmission systems as well as various broadcast systems in accordance with service convergence, which may be referred to as multiplay services. The broadcast service providers may also provide broadcast services on IP networks. Integrated service guide transmission/reception systems may be described using terms of entities defined in the 3GPP standards and OMA BCAST standards (e.g., a scheme). It is anticipated that the service guide/reception systems may be used with any suitable communication and/or broadcast system.

Referring to FIG. 4, the scheme may include, for example, (1) Name; (2) Type; (3) Category; (4) Cardinality; (5) Description; and (6) Data type. The scheme may be arranged in any manner, such as a table format of an XML format.

The "name" column indicates the name of an element or an attribute. The "type" column indicates an index representing an element or an attribute. An element can be one of E1, E2, E3, E4, . . . , E[n]. E1 indicates an upper element of an entire message, E2 indicates an element below the E1, E3 indicates an element below E2, E4 indicates an element below the E3, and so forth. An attribute is indicated by A. For example, an "A" below E1 means an attribute of element E1. In some cases the notation may mean the following E=Element, A=Attribute, E1=sub-element, E2=sub-element's subelement, E[n]=sub-element of element[n−1]. The "category" column is used to indicate whether the element or attribute is mandatory. If an element is mandatory, the category of the element is flagged with an "M". If an element is optional, the category of the element is flagged with an "O". If the element is optional for network to support it the element is flagged with a "NO". If the element is mandatory for terminal to support it is flagged with a TM. If the element is mandatory for network to support it the element is flagged with "NM". If the element is optional for terminal to support it the element is flagged with "TO". If an element or attribute has cardinality greater than zero, it is classified as M or NM to maintain consistency. The "cardinality" column indicates a relationship between elements and is set to a value of 0, 0 . . . 1, 1, 0 . . . n, and 1 . . . n. 0 indicates an option, 1 indicates a necessary relationship, and n indicates multiple values. For example, 0 . . . n means that a corresponding element can have no or n values. The "description" column describes the meaning of the corresponding element or attribute, and the "data type" column indicates the data type of the corresponding element or attribute.

To appropriately render the information the content advisory rating information may be provided for content and/or program and/or service and/or components of a program via syntax elements and sub-elements. The term parental ratings and content advisory rating may be used interchangeably. Also content advisory rating may also be indicated for different rating regions in a manner suitable for such rating regions. Further, for a rating region, a rating value may be provided for one or more rating dimensions. In this manner, information may be defined for the content advisory rating to appropriately render the information in a manner suitable for the viewer. Preferably, the content advisory rating information is provided in a XML format.

By way of example, one set of content advisory rating especially suitable for the United States may be television (TV) parental guidelines which may include information related to explicit sexual content, graphic violence, and strong profanity in television programs. One rating may be TV-Y which indicates the program is designed to be appropriate for all children. One rating may be TV-Y7 which indicates the program is designed for children age 7 and above. One rating may be TV-G which indicates most parents would find this program suitable for all ages. One rating may be TV-PG which indicates this program contains material that parents may find unsuitable for younger children. One rating may be TV-14 which indicates this program contains some materials that many parents would find unsuitable for children under 14 years of age. One rating may be TV-MA which indicates that this program is specifically designed to be viewed by adults and therefore may be unsuitable for children under 17. In addition, the rating may include sub-ratings, such as for example, D for suggestive dialogue, L for coarse language, S for sexual content, V for violence, FV for fantasy violence, and EI for educational and information. With these different choices and options, it is desirable to provide suitable information such that it may be rendered in a suitable manner.

By way of example, one set of content advisory rating especially suitable for the United States may be Motion Picture Association of America (MPAA) film rating system which may include information which empowers families to make informed movie choices.

One rating may be G (General Audiences) which indicates nothing that would offend parents for viewing by children. One rating may be PG (Parental guidance suggested) which indicates parents urged to give "parental guidance". As such PG material may contain some material a parent might not like for their young children.

One rating may be PG-13 (Parents strongly cautioned) which indicates parents are urged to be cautious. Some material may be inappropriate for pre-teenagers.

One rating may be R (Restricted) which indicates contains some adult material. Parents are urged to learn more about the film before taking their young children with them.

One rating may be NC-17 (No one 17 and under admitted) which indicates clearly adult content and children are not admitted.

By way of example, one set of content advisory rating especially suitable for the South Korea may include information related to all ages, inappropriate for children younger than 7, inappropriate for those younger than 12, inappropriate for children under 15, programs intended for adults only, and exempt.

One rating may be All All 모든 연령 시청가, Mo-deun yeon-ryeong si-cheong-ga) which indicates programming that is appropriate for all ages.

This program usually involves programs designed for children or families. This rating does not have an icon.

One rating may be 7 (7세 이상 시청가, chil-se ii-sang si-cheong-ga) which indicates programming that may contain material inappropriate for children younger than 7, and parental discretion should be used.

Some cartoon programming not deemed strictly as "educational", and films rated "G" or "PG" in North America may fall into the 7 category.

One rating may be 12 (12세 이상 시청가, All sib-ee-se ii-sang si-cheong-ga) which indicates programs that may deemed inappropriate for those younger than 12, and parental discretion should be used.

Usually used for animations that have stronger themes or violence then those designed for children, or for reality shows that have mild violence, themes, or language.

One rating may be 15 (15세 이상 시청가, sib-o-se ii-sang si-cheong-ga) which indicates programs that contain material that may be inappropriate for children under 15, and that parental discretion should be used. Examples include most dramas, and talk shows on OTA (over-the-air) TV (KBS, MBC, SBS), and many American TV shows/dramas on Cable TV channels like OCN and OnStyle. The programs that have this rating may include moderate or strong adult themes, language, sexual inference, and violence. As with the TV-MA rating in North America, this rating is commonly applied to live events where the occurrence of inappropriate dialogue is unpredictable.

One rating may include 19 (19세 이상 시청가, sib-gu-se ii-sang si-cheong-ga) which indicates programs that are intended for adults only.

Programs that receive this rating will almost certainly have adult themes, sexual situations, frequent use of strong language and disturbing scenes of violence. One rating may be exempt which indicates knowledge based game shows; lifestyle shows; documentary shows; news; current topic discussion shows; education/culture shows; sports that excludes MMA or other violent sports; and other programs that Korea Communications Standards Commission recognizes. Some of these ratings may include icons while others do not include icons.

As it may be observed, for the United States the rating information is provided in English while for other countries, such as South Korea, the rating information may be provided in another language, such as Korean. In this manner, the content advisory rating indication may accommodate the differences in the language. In addition, with the frequency of those fluent with different languages or rating systems, the content advisory system may accommodate the selection among a plurality of different ratings systems.

Referring to FIG. 5 and to FIG. 7, the content advisory rating in the service announcement may include a plurality of different elements, sub-elements, and attributes for indicating content advisory rating information in service announcements along with their semantic meanings. Although the FIGS. 5 and 7 and associated description below refers to service announcement the same information could be transmitted in service signaling or some other service related transmission and reception.

The ContentAdvisoryRatings is an upper element E1 of an entire message which is mandatory for a terminal to support it (e.g., TM) and mandatory for a network to support it (e.g., NM) with no value or multiple values (0 . . . N). The content advisory rating for a rating region may contain one or more of the following elements, namely, RegionIdentifier, RatingDescription, RatedDimensions, and RatingDimVal. The ContentAdvisoryRatings may be of a type CARatingType which indicates the number of content advisory rating.

The CARatingType may include the RegionIdentifier, RatingDescription, RatedDimensions, and RatingDimVal. The RegionIdentifier is a sub-element (e.g., E2) of ContentAdvisoryRatings of a message which is mandatory for a terminal to support it (e.g., TM) and mandatory for a network to support it (e.g., NM) with cardinality of 0 (i.e. element is absent) or 1 element (e.g, cardinality of 0 . . . 1). The RegionIdentifier specifies the rating region for which the rating description and rating dimension, and rating value data is specified. If not present the value of RegionIdentifier is inferred to be 0. The RegionIdentifier may be of a type xs:unsignedByte which identifies a country or a region or otherwise.

The RatingDescription is a sub-element (e.g., E2) of ContentAdvisoryRatings of a message which is mandatory for a terminal to support it (e.g., TM) and mandatory for a network to support it (e.g., NM) with a cardinality of 1 element indicating a necessary occurrence of this element. The RatingDescription specifies a rating description text which represents the rating suitable for on-screen display. The RatingDescription may include an attribute xml:lang. The RatingDescription may be of a type xs:string.

The xml:lang is an attribute (e.g., A) of sub-element E2 RatingDescription of a message which is mandatory for a terminal to support it (e.g., TM) and mandatory for a network to support it (e.g., NM) with a cardinality of 0 (i.e. element is not present) or 1 element value (e.g, cardinality of 0 . . . 1). The xml:lang indicates the language of the RatingDescription expressed with an XML attribute xml:lang. The xml:lang may be of a type xs:string.

The RatedDimensions is a sub-element (e.g., E2) of ContentAdvisoryRatings of a message which is mandatory for a terminal to support it (e.g., TM) and mandatory for a network to support it (e.g., NM) with no element or 1 element (e.g, cardinality of 0 . . . 1). The RatedDimensions specifies the number of region specific rating dimensions for which content advisory rating is specified. The RatedDimensions may be of a type xs:unsignedByte which indicates a number of dimensions.

The RatingDimVal is a sub-element (e.g., E2) of ContentAdvisoryRatings of a message which is mandatory for a terminal to support it (e.g., TM) and mandatory for a network to support it (e.g., NM) with no element or multiple elements (cardinality of 0 . . . N). The RatingDimVal specifies the content advisory rating dimension and rating value for a rated dimension. The RatingDimVal may contain RatingDimension and RatingValue. The RatingDimVal may be of a type RatingDimValType.

The RatingDimension is a sub-element (e.g., E3) of RatingDimVal of a message which is mandatory for a terminal to support it (e.g., TM) and mandatory for a network to support it (e.g., NM) with no element or 1 element (e.g., cardinality of 0 . . . 1). When not present the value of RatingDimension is inferred to be equal to 0. The RatingDimension specifies a rating dimension index for which the rating value is specified. The RatingDimension may be of a type xs:unsignedByte.

The RatingValue is a sub-element (e.g., E3) of RatingDimVal of a message which is mandatory for a terminal to support it (e.g., TM) and mandatory for a network to support it (e.g., NM) with a cardinality of 1 indicating the element may be present, i.e. is mandatory. The RatingValue specifies rating value for the rating dimension specified in the associated RatingDimension element. In an alternate example the RatingValue may include an attribute xml:lang which specifies the language for the RatingValue. The RatingValue may be of a type xs:unsignedByte.

One difference between FIG. 5 and FIG. 7, is that FIG. 5 further includes a RatingValueString element. RatingValueString element describes Rating value text string for the rating dimension specified in the associated RatingDimension element.

The RatingValueString element allows keeping a content advisory rating information for a service/program/content/component unchanged even when rating region table is changed (for example by insertion of a new rating in between two ratings) when graduated scale is used.

The value of the element RatingValueString may be equal to one of the values defined (rating_value_text( )) in the rating region table for the rating dimension indicated by the value of the associated RatingDimension element.

There may be only one of the RatingValue or RatingValueString elements present inside a RatingDimValue element.

When graduated_scale value in the rating region table for the rating dimension indicated by the value of the RatingDimension element inside a RatingDimVal element is equal to 1 the RatingValueString element may be present inside this RatingDimVal element.

An additional example is described below.

When graduated_scale value in the rating region table for the rating dimension indicated by the value of the RatingDimension element inside a RatingDimVal element is equal to 0 the RatingValue element may be present inside this RatingDimVal element.

When graduated_scale value in the rating region table for the rating dimension indicated by the value of the RatingDimension element inside a RatingDimVal element is equal to 1 the RatingValue element may not be present inside this RatingDimVal element.

When graduated_scale value in the rating region table for the rating dimension indicated by the value of the RatingDimension element inside a RatingDimVal element is equal to 0 the RatingValueString element may not be present inside this RatingDimVal element.

In another example, the number of occurrences of the RatingDimVal element may be equal to the value inside the RatedDimensions element.

In another example, the value of the element RatingDimension may be less than or equal to the number of rating dimensions defined in the rating region table.

In another example, one or more of the following constraints may be applied on elements in FIG. 5 and/or FIG. 7.

The value of the element RatingDimension may be less than or equal to the number of rating dimensions defined (dimensions_defined) in the rating region table.

The value of the element RatingValue may be less than or equal to the number of rating values defined (values_defined) in the rating region table for the rating dimension indicated by the value of the associated RatingDimension element.

The value of the element RatingValueString may be equal to one of the values defined (rating_value_text( )) in the rating region table for the rating dimension indicated by the value of the associated RatingDimension element.

There may be only one of the RatingValue or RatingValueString elements present inside a RatingDimValue element.

When graduated_scale value in the rating region table for the rating dimension indicated by the value of the RatingDimension element inside a RatingDimVal element is equal to 1 the RatingValueString element may be present inside this RatingDimVal element.

Cardinality of RatingDimension is 0 . . . 1. When not present the value of RatingDimension is inferred to be equal to 0.

In another example, the value of the element RatingDimension may be less than or equal to the element dimensions_defined in the rating region table defined in PSIP Content Advisory Descriptor of ATSC A/65: 2013, Program and System Information Protocol, incorporated by reference herein in its entirety.

In another example, the value of the element RatingValue may be less than or equal to the number of rating values defined in the rating region table for the rating dimension indicated by the value of the associated RatingDimension element.

In another example, the value of the element RatingValue may be less than or equal to the number of rating values defined in the element values_defined in the rating region table for the rating dimension indicated by the value of the associated RatingDimension element with values_defined being an element rating region table in PSIP Content Advisory Descriptor of ATSC A/65: 2013, Program and System Information Protocol, incorporated by reference herein in its entirety.

In another example, when not present the value of RatingDimension is inferred to be 0.

In another example, when not present the value of RegionIdentifier is inferred to be 1. In another example, when not present the value of RegionIdentifier is inferred to be 0.

In another example, when not present the value of RegionIdentifier is inferred to be 0, which is inferred to be zero valued rating for the rating dimension(s).

In another example, the RatingDescription element which represents the rating description text follows the semantics of the rating_description_text( ) in PSIP Content Advisory Descriptor of ATSC A/65: 2013, Program and System Information Protocol, incorporated by reference herein in its entirety.

In another example, E1 of the PSIP Content Advisory Descriptor of ATSC A/65: 2013, Program and System Information Protocol, incorporated by reference herein in its entirety, may include its elements coded as binary data and embedded inside an XML element.

The content advisory rating information may be indicated in the service announcement at one or more locations, namely, (1) inside a Service fragment for a service, (2) inside a Content fragment for a content, and (3) inside a Content fragment for a component of a content.

In one example, an exemplary XML schema is illustrated in FIG. 6 which corresponds to the structure in FIG. 5.

In one example, an exemplary XML schema is illustrated in FIG. 8 which corresponds to the structure in FIG. 7.

With respect to the XML schema following variations may be done which are within the scope of this example:

In another example, some of the use='optional' may be changed to use='required'.

In another example, some of the elements cardinality may be changed from 0 . . . 1 to 1.

In another example, for some of the elements the minOccurs="1" may be changed to minOccurs="0".

In another example, for some of the elements the minOccurs="0" may be changed to minOccurs="1".

In another example, for some of the elements the maxOccurs="unbounded" may be changed to maxOccurs="1".

In another example, some of the elements above may be changed from E2 to E1 or from E1 to E2 or from Ej to Ei for any j and i.

In another example, the cardinality of some of the elements may be changed. For example cardinality may be changed from "1" to "1 . . . N" or cardinality may be changed from "1" to "0 . . . N" or cardinality may be changed from "1" to "0 . . . 1" or cardinality may be changed from "0 . . . 1" to "0 . . . N" or cardinality may be changed from "0 . . . N" to "0 . . . 1".

In another example, some of the elements could be signaled as attributes.

In another example, some of the required elements may be changed to optional elements or vice-a-versa.

In another example, some of the "NM/TM" values in the "category" may be changed to "NM/TO" or "NO/TM" or "NO/TO", with TM means mandatory for a terminal to support it and NM means mandatory for a network to support it, TO means optional for a terminal to support it and NO means optional for a network to support it.

In another example, other formats, for example JSON/CSV/BNF/ABNF/EBNF, may be used for representing the same information conveyed in the XML format.

In another example, an additional namespace qualifier may be added for an xml element/attributes/type. For example <xs:element name="CARatingType"> may be called <xs:complexType name="atsc3:CARatingType"> or <xs:complexType name="atsc:CARatingType"> where atsc3 and atsc respectively indicate namespace.

In another example, for example <xs:element name="RegionIdentifier" . . . may be called <xs:element name="atsc3:RegionIdentifier" . . . or <xs:element name="atsc:RegionIdentifier" . . . where atsc3 and atsc respectively indicate namespace.

In another example, elements ContentAdvisoryRatings, RegionIdentifier, RatingDescription, RatedDimensions, RatingDimVal, RatingDimension, RatingValue may be called car, ri, rde, rdis, rdv, rd, rv respectively. Other such abbreviations may also be used. The benefit is to save on the number of bytes used to signal the XML data. Thus when listing several strings the representation as an example <rd>5</rd> will use fewer bytes than <RatingDimension>String1</RatingDimension>.

In another example, a XML element B inside a XML element A may be represented as element A.B. For example RegionIdentifier element inside ContentAdvisoryRatings element may be represented as ContentAdvisoryRatings.RegionIdentifier element.

Similarly RatingDescription element inside ContentAdvisoryRatings element may be represented as ContentAdvisoryRatings.RatingDescription element.

By way of example, referring again to FIG. 5, there may be N number of CARatingTypes for the content advisory rating. By way of example, the RegionIdentifier may be a number that refers to a rating system of a particular country (e.g., South Korea or United States) or a geographic region or otherwise. By way of example, the RatingDescription may be program's rating in abbreviated form or otherwise suitable for on-screen display. For example this may be "TV-Y7 FV" to indicate program directed to older children (with age 7 and above) with fantasy violence as per TV parental guidelines ratings. By way of example, the RatedDimensions may indicate the number of different ratings within the particular region previously identified that is included within the particular syntax structure. By way of example, RatingDimVal is a structure that provides for the number of different ratings of RatedDimensions, and are provided as pairs of the RatingDimension and RatingValue for the particular content. The RatingDimension indicates which of the ratings (e.g., as an index into a table) and the RatingValue indicates the value of that RatingValue. By way of example, a first RatingDimension may be MPAA (e.g., an index within a rating region table) with a RatingValue of PG, a second RatingDimension may be TV Parental Guidelines (e.g., an index within a rating region table) with a RatingValue of TV:PG. In this manner, the syntax supports multiple rating systems for a particular region.

The content advisory rating information could be included in content fragment and/or service fragment and/or for any component of a content fragment.

Additional examples related to the service signaling are described herein. In general, the service announcement and the service signaling may also be as described herein. The service announcement may include information about programming and services that is designed to allow the viewer or user to select services and/or content. Service signaling may include information that enables the receiver to locate and acquire services and to perform navigation of the service.

The table structure in FIG. 5 and the corresponding XML schema in FIG. 6, or the table structure in FIG. 7 and the corresponding XML schema in FIG. 8, result in a representation of content advisory rating that is suitable for the service announcement. In general, the XML representation may be verbose and, thus, need a relatively large number of bits to represent the content advisory rating information. In certain situations, such as for service signaling, the content advisory rating information for a program and/or content and/or service may be more compactly represented in a string. Furthermore, the content advisory rating for a program and/or content and/or service may be represented in the form of a Uniform Resource Identifier (URI) and a value. This representation is advantageous as the service signaling may repeat the service information of a particular service and/or content and/or program frequently. In this case, the string may be used as a value along with a URI scheme to more compactly represent the service signaling information as described below. This provides a benefit of a more compact representation.

Signaling content advisory information in the service signaling may include one or more of the following steps In one step, a transformation technique may receive as input an XML formatted content advisory rating related elements and/or sub-elements. The XML formatted elements and/are sub-elements are then converted into a string by said transformation. This conversion may be achieved using any suitable technique. For example, a XPath based operator and functions may be used to define the conversion. For example, a XSL transformation may be used to define the conversion.

In another step, a URI construction technique that is based on the transformed string for the content advisory rating information signaling may be used.

In another step, the content advisory rating information in the form of the URI and/or a <Transformed content advisory rating string> and/or a string is signaled by its inclusion in the service signaling layer.

The <Transformed content advisory rating string> as a result of the conversion technique may include one or more parts separated by delimiters. The first delimiter may be a comma (,) or any other suitable delimiter. In an example, the conversion technique includes three parts.

A first part of the string indicates the Region Identifier coded as an unsigned byte value. This first part specifies the rating region for which rating description and rating dimension value tuples appearing in another part of the string are specified. If not present, an empty first part is included for the Region Identifier followed by the first delimiter. An empty first part is included for the region Identifier means that a value for the Region Identifier is not included in the string. In an example, if a value for the Region Identifier is not included in the string, any device receiving the string may infer the value of Region Identifier equal to a predefined value (such as the value 1).

A second part of the string indicates the Rating Description information enclosed inside a second delimiter. In an example, the Rating Description information is coded as a string. In an example, the second delimiter may be a quote (') or any other suitable delimiter. A Rating Description information represents the rating suitable for on-screen display.

In an example, the language of the string may be included as an element of the string separated by a delimiter. In an example, the element is the first part of the string and the delimiter is a third delimiter, followed by the actual Region Description text. The third delimiter may be a colon (:) or any other suitable delimiter. If not present, an empty second part is included followed by the first delimiter.

A third part of the string includes of one or more tuples that provide information about rating dimension and rating value. These tuples may be enclosed inside additional delimiters. In an example, the delimiters are the fourth and a fifth delimiter. In an example, the fourth delimiter may be left curly brace ({) and the fifth delimiter is right curly brace (}). In an example, other suitable delimiter(s) are used. In any tuple, the rating dimension and rating value may be separated by another delimiter. In an example, the delimiter is a sixth delimiter. The sixth delimiter may be a space ( ), i.e. character %x20, or any other suitable delimiter. The rating dimension may be coded as an unsigned byte. The rating value may be coded as an unsigned byte or as a string. If the rating value is coded as a string then it is preferably enclosed inside another delimiter. In an example, the delimiter is a seventh delimiter. The seventh delimiter may be a double quote (") or any other suitable delimiter. If multiple tuples of rating dimension and rating value are included in the third part then the multiple tuples may be separated by another delimiter. In an example, the delimiter is an eighth delimiter. In an example, the eighth delimiter may be empty or any other suitable delimiter. Thus the multiple tuples of rating dimension and rating value may be included without any additional separator or delimiter. If the rating dimension is not included then it is inferred to be equal to 0. In an example, the third part is not empty.

It is anticipated that the three parts of the string may be provided and/or transmitted in any order. In an example, the first part is followed by the second part that is followed by the third part. One potential benefit of the example is that the first part indicates the region the second and third part applies to.

If additional content advisory information data is provided and/or transmitted for the same program then additional strings may be concatenated to create one string for the additional content advisory information data. In an example, the additional strings may contain multiple concatenated three part strings. In an example, the third part of any content advisory information except the last is followed by a delimiter. Thus the last character of the <Transformed content advisory rating string> may be equal to the fifth delimiter character.

Figure 9:
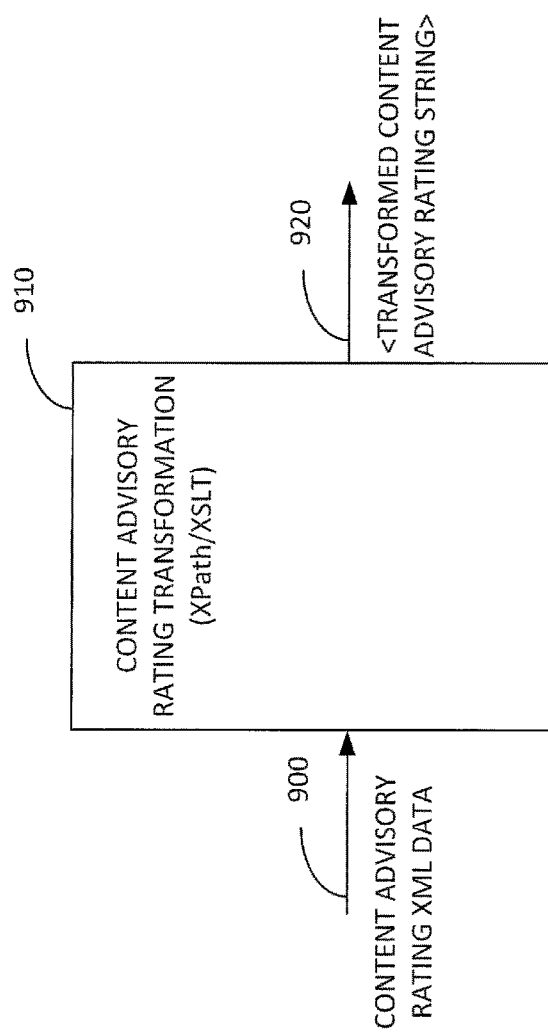
FIG. 9 illustrates transformation of content advisory information.

FIG. 9 illustrates an example transformation of content advisory information input XML data 900 to <Transformed content advisory rating string> 920 done by a "Content advisory rating transformation" module 910. The "Content advisory rating transformation" module 920 may use XPath and/or XSLT for the transformation, as examples. XPath is defined at http://www.w3.org/TR/xpath20/ and http://www.w3.org/TR/xpath/, which are incorporated herein by reference. XPath is an expression language that allows the processing of and navigation through elements and attributes in an XML document. XSLT is defined at http://www.w3.org/TR/xslt, which is incorporated herein by reference. XSL (EXtensible Stylesheet Language) is a style sheet language for XML documents. XSLT is a language for transforming a first XML document into a second XML document.

The generation of the <Transformed content advisory rating string> may be achieved in any suitable manner. In an example, XPath based operators and functions may be used to define the transformation and generation of <Transformed content advisory rating string>. In this example, content advisory rating data is provided as input to the XPath transformation. The XPath transformation employs operators and functions to convert the input data into a<Transformed content advisory rating string>. In an example, input data maybe in an XML format.

In an example, the content advisory information XML data may be transformed into <Transformed content advisory rating string> using an XPath transformation as shown in FIG. 11.

The XPath transformation shown in FIG. 11 is based on the XML schema defined in FIG. 8 for ContentAdvisoryRatings element. In the schema in FIG. 8 the RatingDimVal element includes only two elements, namely RatingDimension and RatingValueString. The ContentAdvisoryRatings element schema may include more elements than the two elements (RatingDimension and RatingValueString) which may be included inside the RatingDimVal element. In this case a XPath transformation which directly refers to RatingDimension and RatingValueString may be useful. Thus in this case the content advisory information XML data may be transformed into <Transformed content advisory rating string> using a XPath transformation as shown below:

---
concat(concat(//RegionIdentifier,',',concat(concat('"',
//RatingDescription),'"')),',',normalize-space(string-join(//RatingDimVal/
concat("{",concat(RatingDimension ,'"', RatingValueString, '"}")),'') ))
---

The main difference between the above XPath transformation and the one in FIG. 11 is as follows. In FIG. 11 all the elements inside RatingDimVal element are used to create the <Transformed content advisory rating string>. In the XPath transformation shown above, only the elements RatingDimension and RatingValueString inside the element RatingDimVal are used to create the <Transformed content advisory rating string>. Additionally in the XPath transformation shown above single quotes (') are used to enclose the RatingValueString element's value.

With respect to FIG. 11 and the above XPath transformation:

concat( ) function accepts two or more inputs and returns a string that is concatenation of the values of the input. String-join($arg1, $arg2) function returns a string created by concatenating the members of the $arg1 sequence using $arg2 as a separator. If the value of $arg2 is the zero-length string, then the members of $arg1 are concatenated without a separator. normalize-space($arg) function returns the value of $arg with whitespace normalized by stripping leading and trailing whitespace and replacing sequences of one or more than one whitespace character with a single space, #x20.

In yet another example instead of using RatingValueString element for creating <Transformed content advisory rating string>, the RatingValue element may be used. Thus in this case the content advisory information XML data may be transformed into <Transformed content advisory rating string> using an XPath transformation as shown below where instead of RatingValueString, the RatingValue element is used:

---
concat(concat(//RegionIdentifier,',',concat(concat('"',
//RatingDescription),'"')),',',normalize-space(string-join(//RatingDimVal/
concat("{",concat(RatingDimension ,'"', RatingValue, '"}")),'') ))
---

In an example, an XSL transformation may create the <Transformed content advisory rating string>. In this case, the content advisory rating data is provided as input to the XSL transformation. The XSLT uses operators and functions to convert the input data into a <Transformed content advisory rating string>. The input data may be in an XML format. In an example, the content advisory information XML data may be transformed into <Transformed content advisory rating string> using XSL transformation as shown in FIG. 12.

The XSL transformation shown in FIG. 12 is based on the XML schema defined in FIG. 8 for ContentAdvisoryRatings element. In the schema in FIG. 8 the RatingDimVal element includes only two elements, namely RatingDimension and RatingValueString. The ContentAdvisoryRatings element schema may include more elements than the two elements (RatingDimension and RatingValueString) inside the RatingDimVal element. In this case a XSL transformation which directly refers to RatingDimension and RatingValueString may be useful. Thus in this case the content advisory information XML data may be transformed into <Transformed content advisory rating string> using a XSL transformation as shown in FIG. 13.

The main difference between above XSL transformation in FIG. 13 and the one in FIG. 12 is as follows. In FIG. 12 all the elements inside RatingDimVal element are used to create the <Transformed content advisory rating string>. In the XLS transformation shown in FIG. 13, only the elements RatingDimension and RatingValueString inside the element RatingDimVal are used to create the <Transformed content advisory rating string>. Additionally in the XSL transformation shown in FIG. 13 single quotes (') are used to enclose the RatingValueString element's value.

In yet another example instead of using RatingValueString element for creating <Transformed content advisory rating string>, the RatingValue element may be used. Thus in this case the content advisory information XML data may be transformed into <Transformed content advisory rating string> using a XSL transformation as shown in FIG. 14 where instead of RatingValueString, the RatingValue element is used.

In another step, a URI construction technique may be used that is based on the transformed string for the content advisory rating information signaling.

Figure 10:
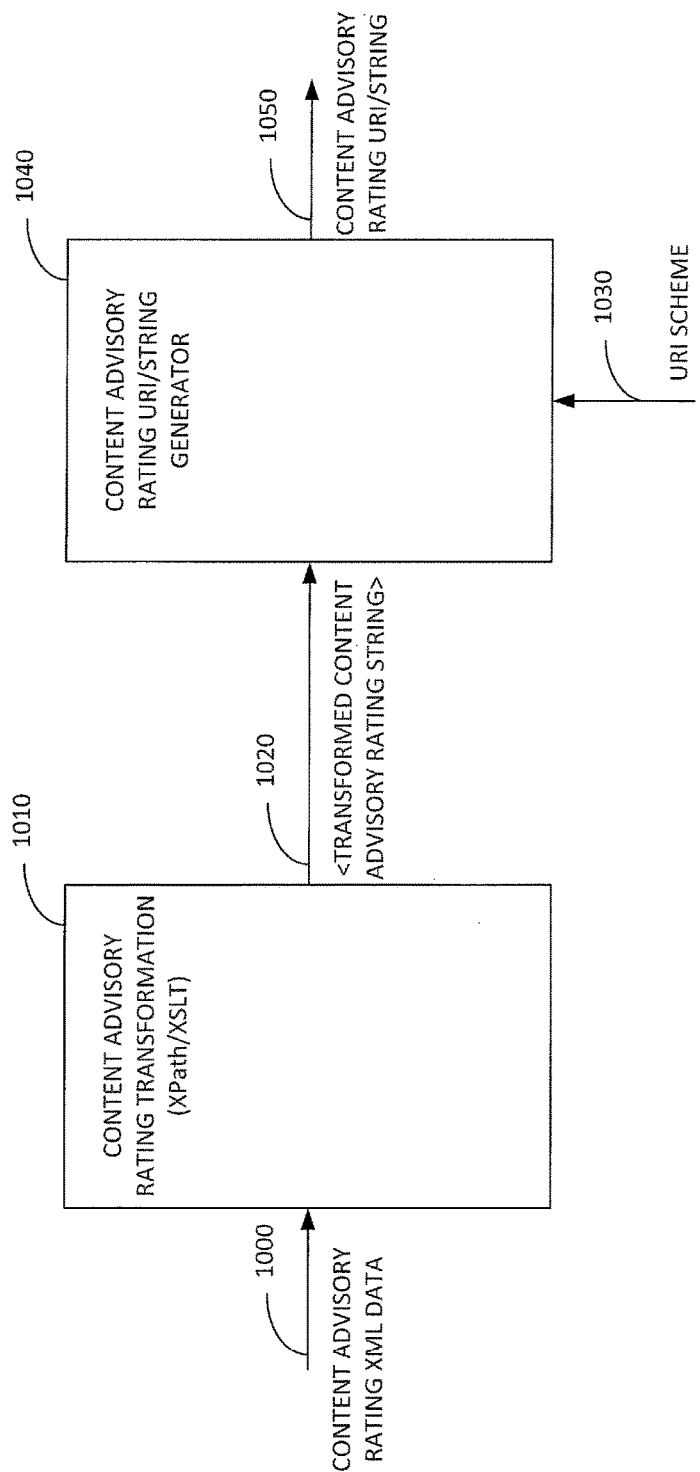
FIG. 10 illustrates transformation of content advisory information and generation of URI/string.

FIG. 10 illustrates an example of the transformation of content advisory information input XML data 1000 into a<Transformed content advisory rating string> 1020 by a "Content advisory rating transformation" module 1010. This is followed by the construction of an URI based on an URI scheme 1030 and the <Transformed content advisory rating string> 1020. A Content Advisory Rating URI/string generator module 1040 receives as an input the URI scheme 1030 and the <Transformed content advisory rating string> 1020. The Content Advisory Rating URI/string generator module 1040 provides a Content Advisory Rating URI/string 1050.

In an embodiment Dynamic Adaptive Streaming over HTTP (DASH) specified in ISO/IEC FDIS 23009-1:2014 (which is incorporated by reference herein in its entirety) may be used for streaming content. DASH is a system for streaming content, services, and/or other media using the Hypertext Transfer Protocol (HTTP). The system includes formats for the Media Presentation Description and Segments In an example, DASH may be used for streaming services content, services, and/or other media over the Internet.

In an example using DASH, a ratings value may be specified in the form of a URI and a value using DASH descriptors. DASH descriptors (or DASH descriptor elements) contain a @schemeIdUri attribute that provides a URI to identify a scheme. DASH descriptor elements may also contain an optional attribute @ value and an optional attribute @id. Semantics of the DASH descriptor elements and/or optional attributes are specific to the scheme employed. The URI identifying the scheme may be a Universal Resource Name (URN), a Universal Resource Locator (URL), or other information to identify the scheme For the Rating element:

@schemeIdUri may be set equal to "urn:atsc:org:carating:1";
@value may be set equal to "<Transformed content advisory rating string>" where <Transformed content advisory rating string> is the string value obtained by using the transformation defined previously, and;
@schemeIdUri equal to "urn:atsc:org:carating:1" indicates the URI scheme.

Thus the overall DASH Rating element may be indicated as:

<Rating schemeIdUri=" urn:atsc:org:carating:1"
value="<Transformed content advisory rating string>"/>

In another step the content advisory rating information in the form of the URI and/or the <Transformed content advisory rating string> and/or a string is signaled by its inclusion in the service signaling layer.

The URI constructed from the previous step and/or the <Transformed content advisory rating string> may be signaled by inclusion in service level signaling. As an example, the constructed URI and/or the <Transformed content advisory rating string> may be included in a DASH Media Presentation Description (MPD) or a MPEG Media Transport (MMT) signaling message. In an example, the constructed URI and/or the <Transformed content advisory rating string> may be included in MMT Package (MP) Table in service level signaling. The MP Table is described in ISO/IEC: ISO/IEC 23008-1, "Information technology— High efficiency coding and media delivery in heterogeneous environments—Part 1: MPEG media transport (MMT)" which is incorporated herein by reference. An MP Table includes information related to a Package including the list of all Assets. Package is collection of media data delivered using MMT. Asset is multimedia data that is associated with a unique identifier and used for multimedia presentation.

In an example, the constructed URI and/or the <Transformed content advisory rating string> may be included in a user service bundle description in a service list table, which lists signaling information about services. The user services may be defined in accordance with 3GPP specifications http://www.3gpp.org/specifications which are incorporated by reference herein.

In an example, the above steps may be achieved in the following manner.

The content advisory rating XML data specified in the ContentAdvisoryRatings element in the service announcement and the Personalization specification is transferred into a content advisory rating string. The ContentAdvisoryRatings element may be as shown in FIG. 5 or FIG. 6 or FIG. 7 or FIG. 8. The content advisory rating string may include three parts separated by a comma (,) as a delimiter. The three parts of the string may be configured as described below.

A first part of the string indicates that the Region Identifier is coded as an unsigned byte value as specified by the RegionIdentifier element inside the ContentAdvisoryRatings element. If the RegionIdentifier element is not present inside the ContentAdvisoryRatings element an empty first part is included for the Region Identifier followed by a comma (,) as a delimiter. An empty part means no information is included, i.e. a value for RegionIdentifier is not included. In this case if not present the value of Region Identifier is inferred to be 1.

The second part indicates the Rating Description text coded as a string as specified by the RatingDescription element inside the ContentAdvisoryRatings element enclosed further inside quote (') delimiters. If RatingDescription element is not present inside the ContentAdvisoryRatings element an empty second part is included followed by a comma (,) as a delimiter. An empty part means no information is included, i.e. a value for RatingDescription is not included.

The third part may include one or more tuples enclosed inside curly braces ({ }). One or more of the tuples may include <rating dimension> separated by a space (%×20) followed by <rating value>. The <rating dimension> is coded as an unsigned byte as specified by RatingDimension element. The rating value may be coded either as an unsigned byte as specified by RatingValue element or as a string as specified by RatingValueString element enclosed further inside double quotes ("). If the RatingDimension element is not present inside the ContentAdvisoryRatings an empty <rating dimension> is coded followed by a space (%×20). An empty part means no information is included, i.e. a value for <rating dimension> is not included. In an example, the third part is not empty. Thus the third part will include at least one character.

If additional content advisory information data is included for the same program then additional three part strings are concatenated to create one string containing multiple concatenated three part strings. In this case the third part of any content advisory information except the last is followed by a comma (,). Thus the last character of the content advisory rating string may be the right curly brace (}).

The content advisory information XML data as specified in the ContentAdvisoryRatings element may be transformed into content advisory rating string using following XPath transformation:

```
concat(concat(//RegionIdentifier,',',concat(concat('"',//RatingDescription),
'"')),',',normalize-space(string-join(//RatingDimVal / concat('"{',
normalize-space(.), '"}'), '"')))
```

In another example the content advisory information XML data as specified in the ContentAdvisoryRatings element is transformed into content advisory rating string using following XSL transformation:

```
<?xml version="1.0" encoding="UTF-8"?>
<xsl:stylesheet version="1.0"
xmlns:xsl="http://www.w3.org/1999/XSL/Transform">
    <xsl:output method="text"/>
    <xsl:variable name="squote">'</xsl:variable>
    <xsl:template match="/">
        <xsl:value-of select="concat(//RegionIdentifier,',')" />
        <xsl:value-of select=
"concat(concat(concat($squote,//RatingDescription),$squote),',')" />
        <xsl:for-each select="//RatingDimVal">
            <xsl:value-of select="concat(concat('{',normalize-
space(concat(., '))),'}')" />
        </xsl:for-each>
    </xsl:template>
</xsl:stylesheet>
```

In alternative example @schemeIdUri may be set equal to some string other than "urn:atsc:org:carating:1". In an example, it may be set equal to "urn:atsc2:org:carating:1" or "urn:atsc:org:carating" or "urn:atsc:org:rating:1" or "urn:atsc:org:parentalrating:1" or "urn:atsc:org:rating" or "urn:atsc:rating" or "urn:atsc:rating:1" or "tag:atsc.org,2016:carating:1", "tag:atsc.org,2016:RRTrating:1" or some other value.

Another example and restrictions are now defined for inclusion of Ratings information in a DASH MPD.

DASH MPD (e.g. MPD element) is a formalized description for a Media Presentation for the purpose of providing a streaming service.

DASH Media Presentation is a collection of data that establishes a bounded or unbounded presentation of media content.

DASH Period (e.g. Period element) is an interval of the Media Presentation, where a contiguous sequence of all Periods constitutes the Media Presentation.

DASH Adaptation Set (e.g. AdpatationSet element) is a set of interchangeable encoded versions of one or several media content components.

DASH Rating element (e.g. Rating element) specifies that content is suitable for presentation to audiences for which that rating is known to be appropriate, or for unrestricted audiences.

DASH Rating element consists of an attribute @schemeIdUri which is used to identify the rating scheme employed. Rating element consists of another attribute @ value which provides the value for the rating for the particular @schemeIdUri.

DASH Adapatation set (e.g. AdaptationSet element) has an attribute @mimeType which specifies the MIME type of the concatenation of the Initialization Segment, if present, and all consecutive Media Segments in the Representation.

A MIME type is a two-part identifier for file formats and format contents transmitted on the Internet. The Internet Assigned Numbers Authority (LANA) is the official authority for the standardization and publication of these classifications. MIME types were first defined in IETF RFC 2045 available at https://www.ietf.org/rfc/rfc2045.txt which is incorporated herein by reference.

DASH Initialization Segment is a Segment containing metadata that is necessary to present the media streams encapsulated in Media Segments, DASH Media Segment is a Segment that complies with media format in use and enables playback when combined with zero or more preceding segments, and an Initialization Segment (if any).

DASH Segment is an unit of data associated with an HTTP-URL and optionally a byte range that are specified by an MPD.

DASH Role element specifies information on role annotation scheme. For the DASH element Role the @schemeIdUri attribute is used to identify the role scheme employed to identify the role of the media content component. Roles define and describe characteristics and/or structural functions of media content components.

In DASH one Adaptation Set or one media content component may have assigned multiple roles even within the same scheme.

When using DASH, the ratings value may be specified by the MPD.Period.AdaptationSet.Rating element. It should be noted that an element described as A.B.C.D indicates that element D is child element of element C which is child element of element B which is child element of element A. When the content advisory corresponds to a rating system defined by an Rating Region Table (RRT), Rating@schemeIdUri may be set equal to "tag:atsc.org, 2016:RRTrating:1". A RRT is a table which defines ratings valid for different regions or countries. RRT is defined in ATSC Standard "Program and System Information Protocol for Terrestrial Broadcast and Cable" A/65:2013 which is incorporated herein by reference. The @value string may be set equal to the content advisory ratings string specified above as "<Transformed content advisory rating string>" where <Transformed content advisory rating string> is the string value obtained by using the transformation defined previously. Alternatively or in addition, content advisories corresponding to other rating systems may be included. For content advisories not corresponding to defined RRTs, different Rating@schemeIdUri values are used, as specified by appropriate regional authorities.

In the DASH MPD, the Rating element is a child element of AdaptationSet element, thus any or all Adaptation Sets in a Period element could be labeled with a content advisory.

When the entire program is to be associated with one content advisory rating which may be the usual case, only one instance of the Rating element with a particular value for Rating@schemeIdUri may be included in the Period as MPD.Period.AdaptationSet.Rating element. Multiple Rating elements with different values for Rating@schemeIdUri may be included in the Period as MPD.Period.AdaptationSet.Rating elements.

In the DASH MPD any ContentComponent element may not include a Rating element. Thus only programs can have a rating in MPD but individual content components can not have a rating indicated in MPD.

When a Period includes only one Adaptation Set, with @mimeType="video/mp4" the Rating element may appear in that AdaptationSet. When a Period includes multiple Adaptation Sets each with @mimeType="video/mp4", the Rating element may appear in each AdaptationSet which includes a Role element whose Role@schemeIdUri is equal to "urn:mpeg:dash:role:2011" and Role@ value is equal to "main".

When a Period includes only Adaptation Sets describing no video components, i.e. none of the AdaptationSet elements have @mimeType="video/mp4", the Rating element may appear only in the first AdaptationSet listed in the MPD for that Period.

It should be noted that an element and corresponding concept above are treated equivalently. For example a Period is equivalent to a Period element. Adaptation Set is equivalent to AdaptationSet element. Rating is equivalent to a Rating element. As such the term "Period" and "Period element" may be used interchangeably. The term "Adaptation Set" and "AdaptationSet element" may be used interchangeably. The term "Rating" and "Rating element" may be used interchangeably.

When a receiver or a player receives a MPD which includes rating information as defined above, it may parse it and interpret it. When a receiver receives a MPD which has multiple MPD.Period.AdaptationSet.Rating elements, it may parse one or more of the MPD.Period.AdaptationSet.Rating elements. It may then parse the @schemeIdUri attribute for one or more of those MPD.Period.AdaptationSet.Rating elements. It may then find the MPD.Period.AdaptationSet.Rating element whose @schemeIdUri attribute is equal to a scheme that the receiver understands.

As an example two MPD.Period.AdaptationSet.Rating elements may be included—one for USA region and other for another country, say CountryA. In this case the @schemeIdUri attribute of the two MPD.Period.AdaptationSet.Rating elements may have different values. A receiver in the USA may use the @value for the MPD.Period.AdaptationSet.Rating element whose @schemeIdUri indicates a rating scheme corresponding to USA to determine the suitability of the content to be shown based on the rating system of USA. A receiver in the other country—CountryA may use the @value for the MPD.Period.AdaptationSet.Rating element whose @schemeIdUri indicates a rating scheme corresponding to CountryA to determine the suitability of the content to be shown based on the rating system of CountryA.

An example of the signaling of the content advisory information follows. In the example, XML data input to content advisory rating transformation (910/1010) may be as follows.

```
<?xml version="1.0" encoding="UTF-8"?>
<ContentAdvisoryRatings>
    <RegionIdentifier>1</RegionIdentifier>
    <RatingDescription>TV - PG - D - L</RatingDescription>
    <RatingDimVal>
        <RatingDimension>0</RatingDimension>
        <RatingValueString>3</RatingValueString>
    </RatingDimVal>
    <RatingDimVal>
        <RatingDimension>1</RatingDimension>
        <RatingValueString>1</RatingValueString>
    </RatingDimVal>
    <RatingDimVal>
        <RatingDimension>2</RatingDimension>
        <RatingValueString>1</RatingValueString>
    </RatingDimVal>
</ContentAdvisoryRatings>
```

<The transformed content advisory string> output from the content advisory rating transformation (910/1010) may be 1, TV-PG-D-L,{0 3}{1 1}{2 1}.

By way of example, in this case the Rating element in DASH may be <Rating schemeIdUri="urn:atsc:org:carating:1" value="1,TV-PG-D-L,{0 3} {1 1}{2 1}"/>.

In other examples, the <The transformed content advisory string> may be one or more strings as shown below, which illustrate alternatives in the use of the delimiters and separators.

1,TV-PG-D-L,{0 3},{1 1},{2 1}
1,TV-PG-D-L,{03},{11},{21}
1,TV-PG-D-L,{0 3},{11},{21}
1,TV-PG-D-L,{{0 3},{1 1},{2 1}}
1,TV-PG-D-L,{{0,3},{1,1},{2,1}}

Another example of the signaling of the content advisory information follows. In the example, XML data input to content advisory rating transformation (910/1010) may be as follows.

```
<?xml version="1.0" encoding="UTF-8"?>
<ContentAdvisoryRatings>
    <RegionIdentifier>1</RegionIdentifier>
    <RatingDescription>TV - PG - D - L-S</RatingDescription>
    <RatingDimVal>
        <RatingDimension>0</RatingDimension>
        <RatingValueString>TV-PG</RatingValueString>
    </RatingDimVal>
    <RatingDimVal>
        <RatingDimension>1</RatingDimension>
        <RatingValueString>D</RatingValueString>
    </RatingDimVal>
    <RatingDimVal>
        <RatingDimension>2</RatingDimension>
        <RatingValueString>L</RatingValueString>
    </RatingDimVal>
    <RatingDimVal>
        <RatingDimension>3</RatingDimension>
        <RatingValueString>S</RatingValueString>
    </RatingDimVal>
</ContentAdvisoryRatings>
```

<The transformed content advisory string> output from the content advisory rating transformation (910/1010) may be 1,'TV-PG-D-L',{0 'TV-PG'}{1 'D'} {2 'L'} {3 'S'}.

By way of example, in this case the Rating element in DASH may be <Rating schemeIdUri="urn:atsc:org:carating:1" value="1,'TV-PG-D-L',{0 'TV-PG'}{1 'D'}{2 'L'}{3 'S'}"/>.

Moreover, each functional block or various features of the base station device and the terminal device (the video decoder and the video encoder) used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It is to be understood that the claims are not limited to the precise configuration and components illustrated above. Various modifications, changes and variations may be made in the arrangement, operation and details of the systems, methods, and apparatus described herein without departing from the scope of the claims.

The invention claimed is:

1. A method for decoding a media presentation description associated with a program included within a video bitstream comprising:
 (a) receiving a period within said media presentation description;
 (b) receiving at least one adaptation set, within said period, describing at least one video component;
 (c) receiving at least one rating element, where (i) each of said at least one rating element is a child element of each of said at least one adaptation set, where any or all adaptation sets in said period is labeled with a content advisory, (ii) only one instance of said at least one rating element with a value for a first scheme is included said period when an entire program is to be associated with one content advisory rating, (iii) multiple rating elements of said at least one rating element with different values for said first scheme are included in said period and (iv) no content component element includes said at least one rating element;
 (d) decoding said media presentation description,
 wherein
 said at least one rating element appears in said at least one adaptation set when said period includes only one said at least one adaptation set,
 said rating element appears in said at least one adaptation set when said period includes multiple adaptation sets, and
 said at least one rating element appears only in a first adaptation set listed for said period when said period includes no adaptation set describing video components.

* * * * *